(12) United States Patent
Ebihara

(10) Patent No.: US 6,172,717 B1
(45) Date of Patent: Jan. 9, 2001

(54) APPARATUS AND METHODS FOR SYNTHESIZING FOREGROUND AND BACKGROUND IMAGES

(75) Inventor: Hitoshi Ebihara, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/124,400

(22) Filed: Jul. 29, 1998

(30) Foreign Application Priority Data

Jul. 31, 1997 (JP) .................................................... 9-206054

(51) Int. Cl.[7] .......................... H04N 5/272; H04N 5/275; H04N 9/74
(52) U.S. Cl. .......................... 348/586; 348/587; 348/591; 348/593
(58) Field of Search ................................. 348/584, 586, 348/587, 590, 591, 592, 597, 593; H04N 9/74, 9/75, 5/272, 5/275

(56) References Cited

U.S. PATENT DOCUMENTS 4,700,232 * 10/1987 Abt ........................................ 348/580
4,947,240 * 8/1990 Hausdorfer ........................... 348/592

* cited by examiner

*Primary Examiner*—Sherrie Hsia
(74) *Attorney, Agent, or Firm*—Limbach & Limbach LLP

(57) ABSTRACT

An image processing unit is provided to solve the problem of an aliasing usually occurred when a foreground image and a background image are synthesized by using a key signal; this image processing unit comprises: an image filter circuit that applies to the foreground image an anti-aliasing processing to make obscure an aliasing that displays a slant graphic border in a stepped indentation due to an insufficiency of the number of pixels; a key filter circuit that applies the anti-aliasing processing to the key signal; and a pixel detection circuit that detects a pixel having a possibility to generate a color mixture by an operation of the image filter circuit from the key signal and a size of the image filter circuit. In this construction, the image filter circuit applies an anti-aliasing processing using only the pixel that constitutes the foreground image and does not contain a background color to the pixel having a possibility to generate the color mixture that the pixel detection circuit detects.

22 Claims, 16 Drawing Sheets

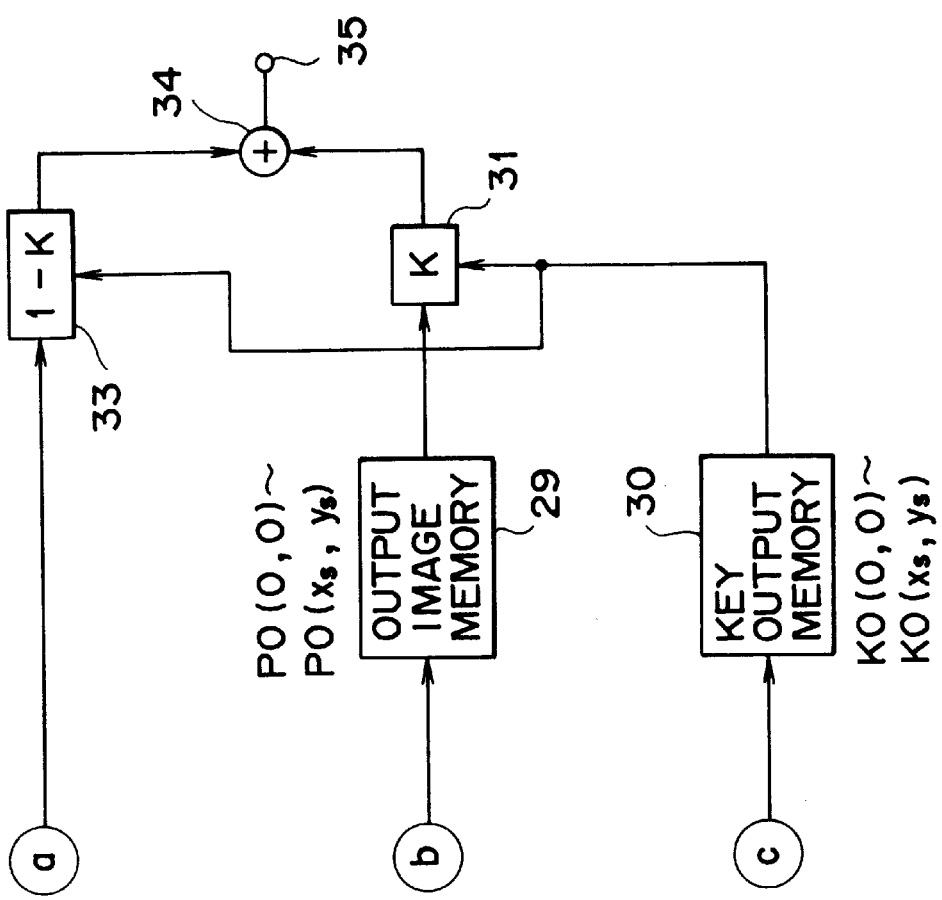

THIS REGION IS ORIGINALLY A BACKGROUND REGION, BUT A KEY VALUE IS GENERATED IN THE PICTURE ELEMENT BY THE FILTER OPERATION

APPARATUS AND METHODS FOR SYNTHESIZING FOREGROUND AND BACKGROUND IMAGES

BACKGROUND OF THE INVENTION

1. Field of the Invention

The present invention relates to an image processing unit that applies an anti-aliasing processing to both an image signal and a key signal, when synthesizing a foreground image and a background image by using the key signal, and a method of the same.

2. Description of the Related Art

When one visual image (foreground image) is synthesized with another visual image (background image) in such a manner as the former hollows out the latter with an arbitrary shape, a key signal is used which represents a composite rate of a picture element of an image against a picture element of another image (hereafter, 'picture element' is abbreviated by 'pixel'). Generally, the key signal is given a value such that a part to be erased as the background is made transparent and a part not to be erased is made opaque by extracting a blue-back (background color) from an input image, or the like.

When a synthesized image in which the foreground image is synthesized with the background image by using this key signal is presented on a raster scanning color display, for example, a stepped aliasing can obviously be observed by some chance especially on a slant line or a periphery of the image plane. This is a phenomenon called the aliasing error resulting from an insufficiency of the number of pixels, which will invite a deterioration of the quality of a synthesized image. Accordingly, the anti-aliasing processing is considered to be necessary which makes the edge parts of the aliasing obscure not to be obvious.

However, only executing a filter operation directly to the key signal for the sake of the anti-aliasing processing will spread the key values on the background area that should originally be made transparent, and there is a possibility that the background color can be observed while synthesizing video signals.

That is, when a simple three-tap filter operation $$Li = F(Ki-1, Ki, Ki+1)$$
$$= (Ki-1 + 2Ki + Ki+1)/4$$

is applied to an input key signal value Ki, for example, as shown in FIG. 13(a) (drawn as i=0–9), the transparency is degraded as to the pixels of i=1, 8 to be originally the background area, as shown in FIG. 13(b).

The anti-aliasing processing becomes necessary also to the foreground image signal to be synthesized. However, only applying a simple filter operation to the foreground image will mix the background color on the border area of the synthesized image, which should originally be removed by the key and should not be observed, which poses a problem.

That is, when a simple three-tap filter operation $$Qi = F(Pi-1, Pi, Pi+1)$$
$$= (Pi-1 + 2Pi + Pi+1)/4$$

is applied to an input image signal value Pi, for example, as shown in FIG. 14(a) (drawn as i=0–9), the foreground color is mixed in i=1, 8 to be originally the background area, and the background color is mixed in i=2, 7 to be the foreground color, as shown in FIG. 14(b).

SUMMARY OF THE INVENTION

The present invention has been made in view of the foregoing problems, and an object of the present invention is to provide an image processing unit that the application of the anti-aliasing processing to both an image signal and a key signal will not mix the foreground image with the background color thereof, and will not deteriorate the picture quality, and a method of the same.

In order to solve the foregoing problem, the image processing unit relating to the present invention synthesizes a foreground image and a background image using a key signal, and comprises: an image filter circuit that applies to the foreground image an anti-aliasing processing to make obscure an aliasing that displays a slant graphic border in a stepped indentation due to an insufficiency of the number of pixels; a key filter circuit that applies the anti-aliasing processing to the key signal; and a pixel detection circuit that detects a pixel having a possibility to generate a color mixture by an operation of the image filter circuit from the key signal and a size of the image filter circuit. In this construction, the image filter circuit applies an anti-aliasing processing using only the pixel that constitutes the foreground image and does not contain a background color to the pixel having a possibility to generate the color mixture that the pixel detection circuit detects.

Here, when the pixel detection circuit detects a border part between a foreground color and a background color of the foreground image from the key signal, the image filter circuit copies the foreground color of the foreground image onto a background color part as to the border part.

Further, when the pixel detection circuit detects an area where the key signal spreads to the background color of the foreground image from the size of the key filter circuit, the pixel detection circuit copies a border pixel of the nearest foreground onto the area.

The image processing method relating to the invention synthesizes a foreground image and a background image using a key signal, when applying to both the image signal and the key signal an anti-aliasing processing to make obscure an aliasing that displays a slant graphic border in a stepped indentation due to an insufficiency of the number of pixels. A pixel having a possibility to generate a color mixture is detected by an operation of the image filter from the size of the image filter that applies the anti-aliasing processing to the foreground image, and to the pixel is applied an anti-aliasing processing by the image filter, which uses only the pixel not containing a background color.

Here, a border part between a foreground color and a background color of the foreground image is detected from the key signal, and as to the border part, the foreground color of the foreground image is copied onto a background color part.

Further, an area in which the key signal spreads to the background color of the foreground image is detected from the size of a key filter circuit that applies the anti-aliasing processing to the key signal, and to the area is applied an anti-aliasing processing that copies a border pixel of the nearest foreground.

According to the invention, a pixel having a possibility to generate a color mixture by an operation of the image filter is detected from the size of the image filter, and as to the pixel, the image filter is switched so as to operate by using only the pixel not containing a background color.

Further, an area in which the key signal spreads to the background color is detected from the size of the key filter, and an anti-aliasing processing that copies a border pixel of the nearest foreground is executed to the area.

The image processing unit relating to the invention synthesizes a foreground image and a background image using a key signal, which comprises: an image filter circuit that applies to the foreground image an anti-aliasing processing to make obscure an aliasing that displays a slant graphic border in a stepped indentation due to an insufficiency of the number of pixels; a control circuit that, on the basis of an identification result of a foreground color/background color of pixels input to the image filter circuit, decides either select to instruct an operation system of the image filter circuit, or to copy the input pixels; and a key filter circuit that applies the anti-aliasing processing to the key signal. In this construction, when the control circuit detects a pixel having a possibility to generate a color mixture from the identification result of a foreground color/background color, the image filter circuit applies an anti-aliasing processing using only the pixel that constitutes the foreground image and does not contain a background color.

Here, when the control circuit detects a border part between a foreground color and a background color of the foreground image from the identification result of a foreground color/background color, as to the border part, the control circuit copies the foreground color of the foreground image onto a background color part.

Further, when detecting an area where the key signal spreads to the background color of the foreground image from the size of the key filter circuit, the control circuit copies a border pixel of the nearest foreground onto the area.

The image processing method relating to the invention synthesizes a foreground image and a background image using a key signal. On the basis of an identification result of a foreground color/background color of pixels input to an image filter unit that applies an anti-aliasing processing to the foreground image, a decision of instructing an operation system of the image filter unit or copying input pixels is controlled.

Here, when a pixel having a possibility to generate a color mixture is detected from the identification result of a foreground color/background color, the image filter unit applies an anti-aliasing processing using only the pixel that constitutes the foreground image and does not contain a background color.

Further, when a border part between a foreground color and a background color of the foreground image is detected from the identification result of a foreground color/background color, the foreground color of the foreground image is copied onto a background color part as to the border part.

Furthermore, when an area in which the key signal spreads to the background color of the foreground image is detected from the size of a key filter unit that applies an anti-aliasing processing to the key signal, a border pixel of the nearest foreground is copied onto the area.

Further the scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 9, 9A and 9B are block diagrams to illustrate a construction of an image processing unit according to an modified example of the embodiment;

DESCRIPTION OF THE PREFERRED EMBODIMENTS

One embodiment of the present invention will hereafter be described in detail with reference to the accompanying drawings.

Figure 1:
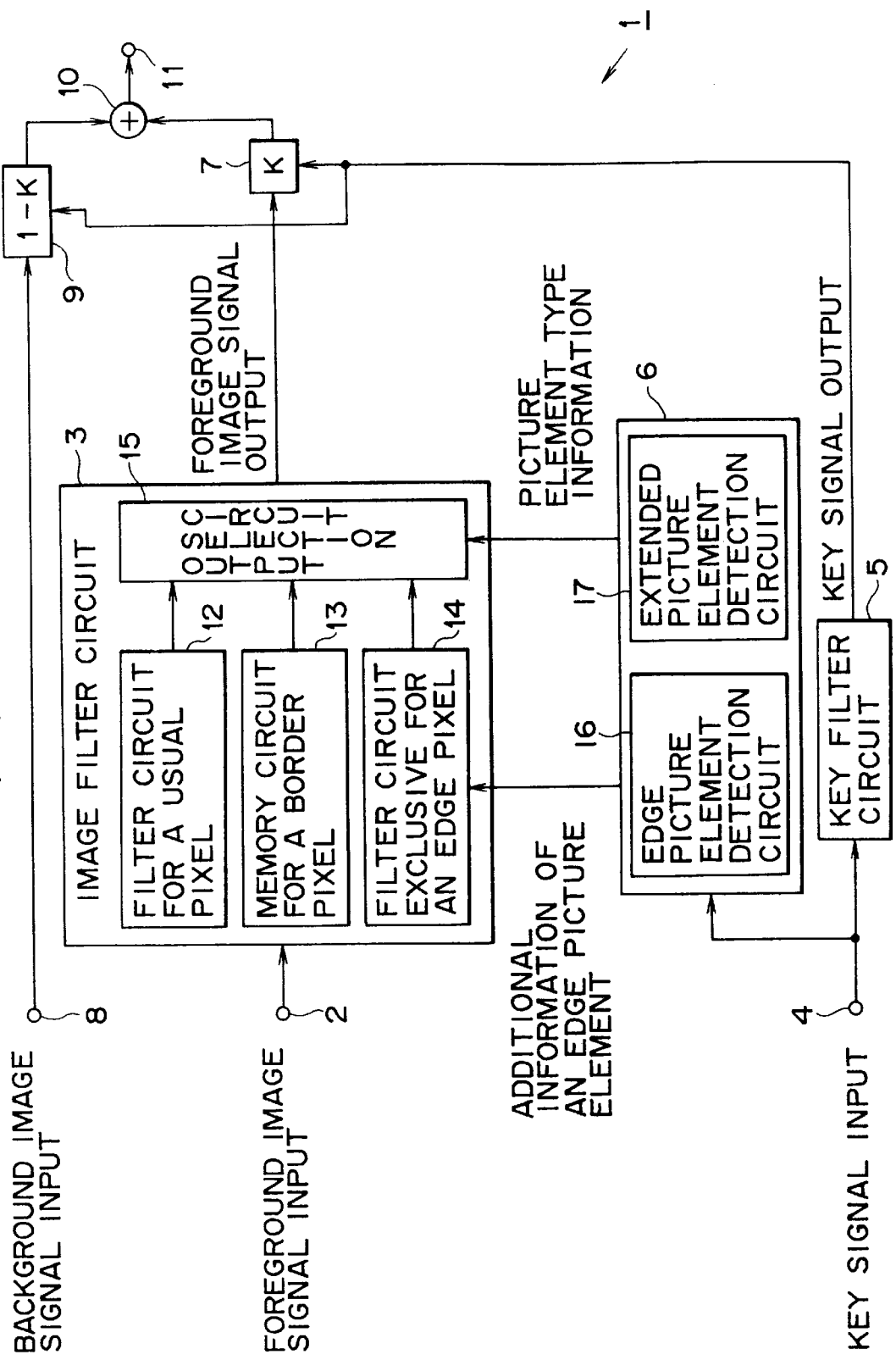
FIG. 1 is a block diagram to illustrate a construction of the image processing unit according to the embodiment of the present invention.

One embodiment of the image processing unit according to the invention is illustrated in an image processing unit 1, as shown in FIG. 1, which synthesizes a foreground image as a computer graphic and a background image as a photograph, for example, by using a key signal.

The image processing unit 1 contains, as shown in FIG. 1, an image filter circuit 3 to apply to a foreground image signal input through a foreground image input terminal 2 an anti-aliasing processing to make obscure the aliasing that indents a slant graphic border into a step-form due to an insufficiency of the number of pixels, a key filter circuit 5 to apply the anti-aliasing processing to a key signal input through a key signal input terminal 4, and a pixel detection circuit 6 to detect a pixel having a possibility to generate a color mixture by the operation of the image filter circuit 3 from the key signal and the size of the image filter circuit 3.

Further, the image processing unit 1 contains a multiplier 7 to multiply a foreground image signal output from the foregoing image filter circuit 3 by a key signal output from the key filter circuit 5 that has applied the anti-aliasing processing to the input key signal, a multiplier 9 to multiply a background image signal input through a background image input terminal 8 by a remainder obtained by subtracting from 1 the key signal output having the anti-aliasing processing applied, and an adder 10 that adds the outputs from the multiplier 7 and the multiplier 9, and outputs a synthesized image from an output terminal 11.

In this image processing unit 1, to the pixel having a possibility to generate a color mixture detected by the pixel detection circuit 6, the image filter circuit 3 applies the anti-aliasing processing using only the pixels that constitute the foreground image and do not contain the background color, and supplies to the multiplier 7 a foreground image signal output having this anti-aliasing processing applied.

The image filter circuit 3 is provided with an anti-aliasing filter circuit 12 for a usual pixel, a memory circuit 13 for a border pixel for a spread pixel, an anti-aliasing filter circuit 14, which is, exclusively for an edge pixel, and an output selection circuit 15 to select the outputs from these circuits 12–14.

The anti-aliasing filter circuit 12 for a usual pixel is a circuit to execute a three-tap filter operation as, for example, $$Qi = F(Pi-1, Pi, Pi+1)$$
$$= (Pi-1 + 2Pi + Pi+1)/4$$

to the foreground image signal input Pi. Provided that the input pixel is not an edge pixel or a spread pixel, the output selection circuit 15 selects the operation result from this filter circuit 12.

The anti-aliasing filter circuit 14, which is exclusively for edge pixels executes a filter operation in the state that a background pixel is not contained. This filter circuit 14, receiving an additional information regarding the edge pixel which will be described later, is able to execute a filter operation in accordance with one (center, right, left, etc.) of the edge pixels. As to the edge pixel, the output selection circuit 15 selects the operation result from this filter circuit 14.

The memory circuit 13 of a border pixel for a spread pixel stores border pixel information of the nearest foreground to the pixels of the input image signal. As to the spread pixel, the output selection circuit 15 selects the output from this circuit 13.

The key filter circuit 5 executes a three-tap filter operation as, for example, $$Li = F(Ki-1, Ki, Ki+1)$$
$$= (Ki-1 + 2Ki + Ki+1)/4$$

to an input key signal value Ki. This filter circuit 5 is only needed to execute one kind of operation.

The pixel detection circuit 6 is provided with an edge pixel detection circuit 16 and a spread pixel detection circuit 17. The edge pixel detection circuit 16 obtains a border pixel of the foreground adjoining to the background area from the key signal, and detects the 'edge pixel' having a possibility to generate a color mixture by the operation from the size of the image filter circuit 3. The spread pixel detection circuit 17 obtains the number of pixels of the key signal spreading to the background area from the size of the key filter circuit 5, and detects the 'spread pixel' for copying the border pixel of the image signal. The pixel detection circuit 6 generates pixel information which is based on the detection information, and sends the pixel information to the output selection circuit 15 of the image filter circuit 3. The detection circuit 6 sends the additional information of the edge pixel to the filter circuit 14 which is exclusively for the edge pixel.

Figure 2:
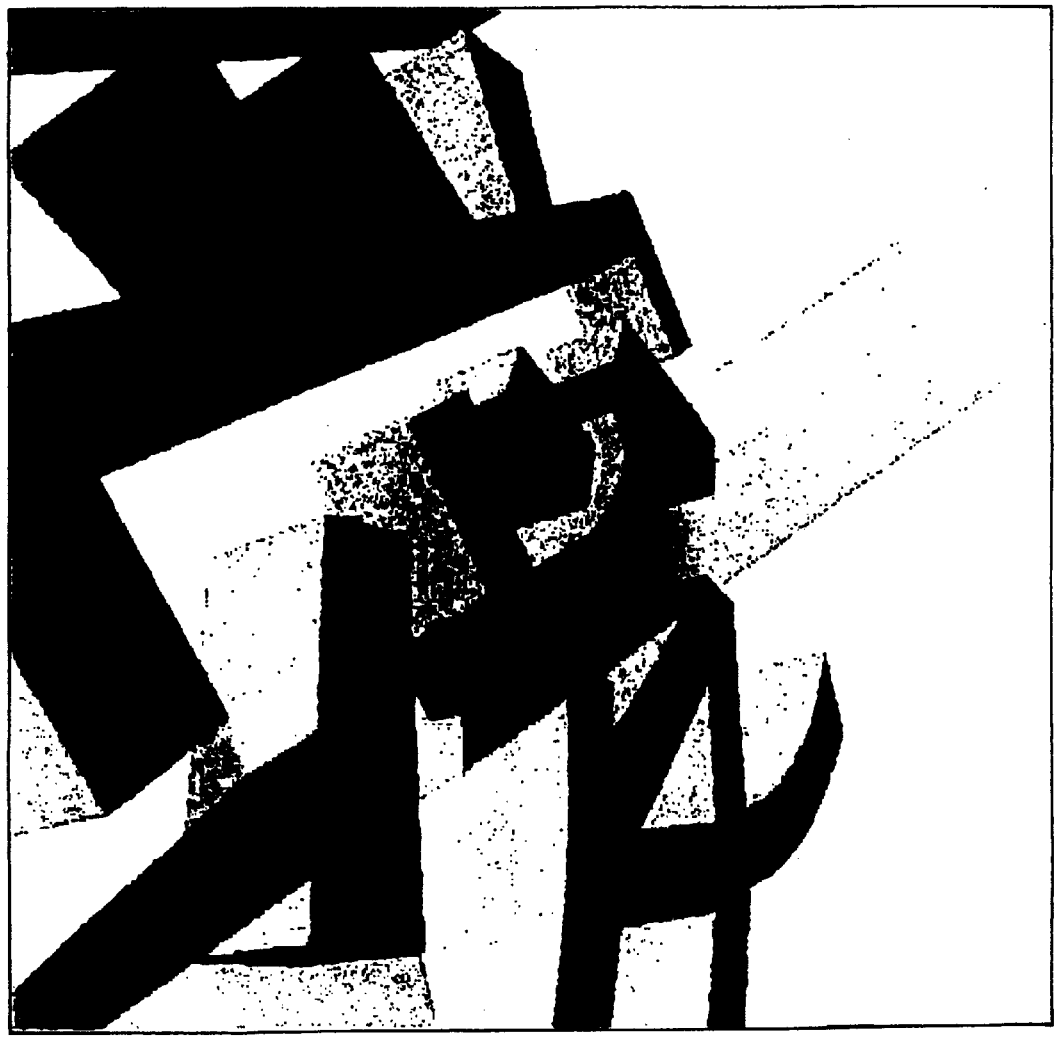
FIG. 2 is a chart to illustrate a CG image input into the foregoing image processing unit as a foreground image.
Figure 3:
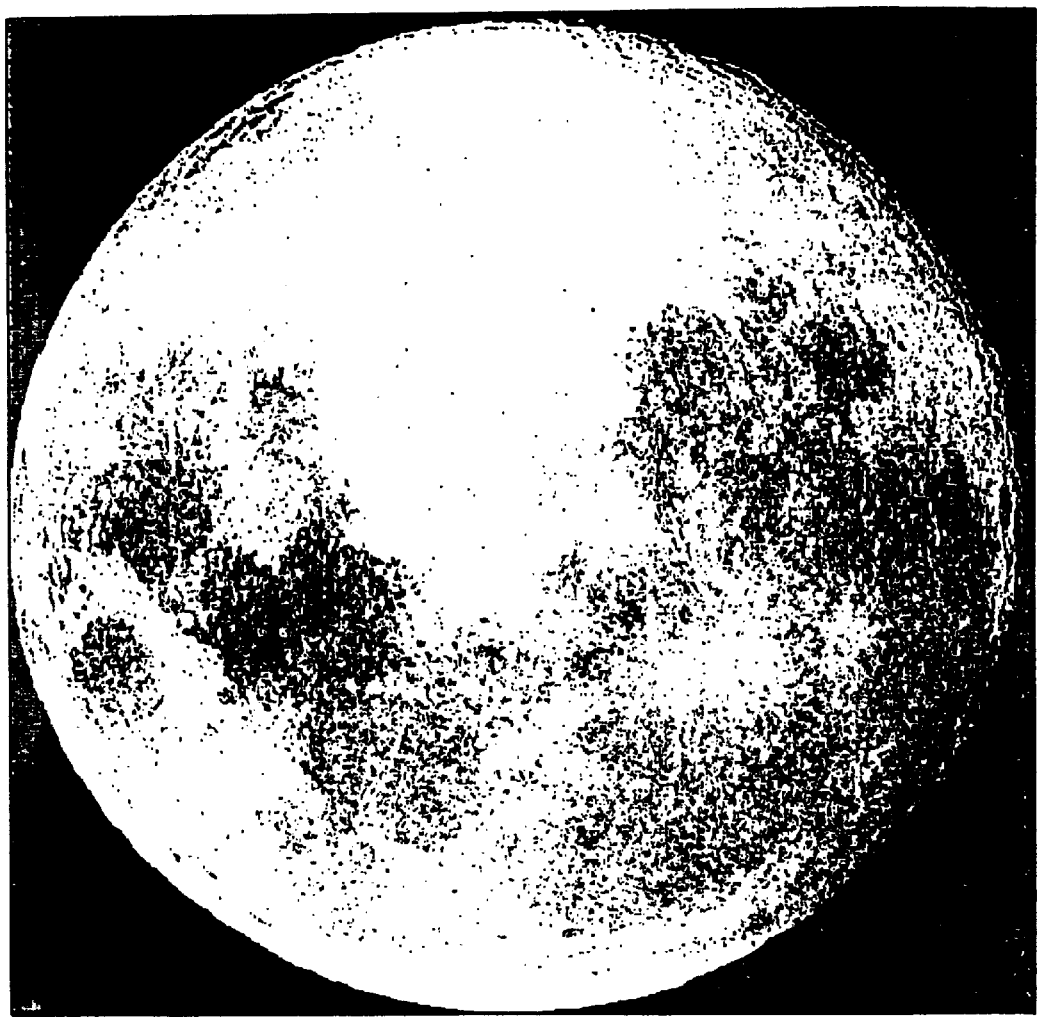
FIG. 3 is a chart to illustrate a photographic image input into the foregoing image processing unit as a background image.

Next, the operation of the image processing unit 1 will be described. Suppose that a CG image as shown in FIG. 2 is input through the image input terminal 2, and a photographic image as shown in FIG. 3 is input through the image input terminal 8. Further, suppose that a key signal, that a key signal generation unit (not illustrated) generates on the basis of the foreground image, is input through the key signal input terminal 4.

Then, the edge pixel detection circuit 16 of pixel detection circuit 6 obtains from the key signal the border pixel (edge) of the foreground image adjoining to the background image.

The filter circuit 12 for a usual pixel of the image filter circuit 3 applies a usual three-tap filter processing to the input image signal.

The filter circuit 14, which is exclusively for an edge pixel of the image filter circuit 3 applies the anti-aliasing processing for the edge to the input image signal.

The pixel detection circuit 6 detects an area in which the key signal spreads to the background color of the foreground image from the size of the key filter circuit 5. Then, the output selection circuit 15 reads out a foreground pixel served as the nearest border pixel to the area, from the memory circuit 13 for a border pixel, and copies the pixel to the background color.

The pixel detection circuit 6 obtains a border pixel of a foreground image adjoining to the background image from the key signal and detects a pixel having a possibility to generate a color mixture, and then the output selection circuit 15 selects a filter output from the filter circuit 14 exclusive for an edge pixel.

Figure 4A:
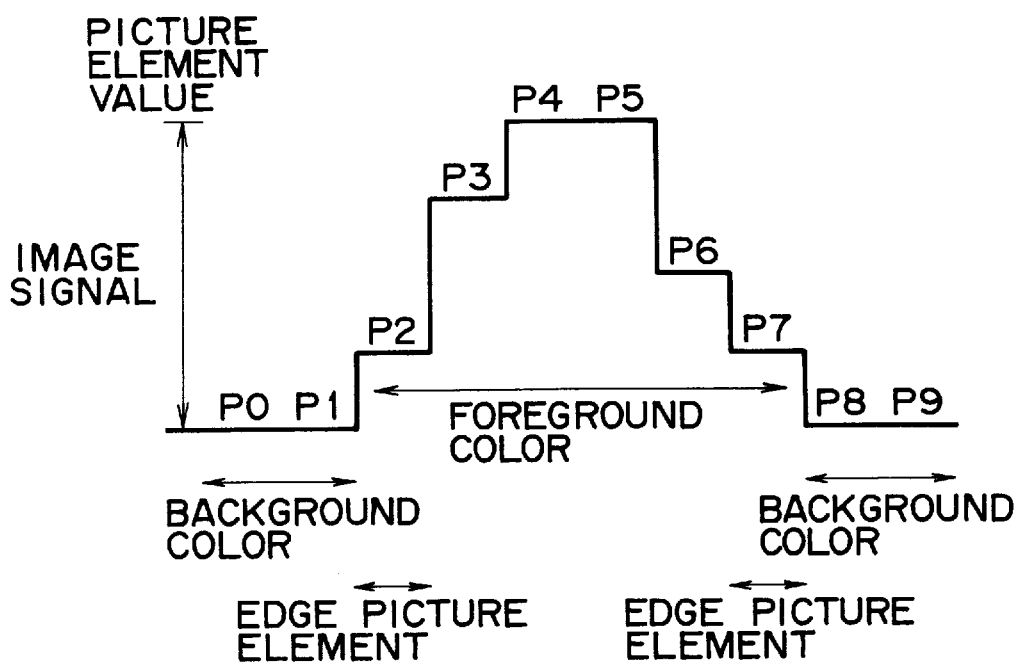
FIGS. 4A and 4B are charts to illustrate an operation example of an edge spread processing.
Figure 4B:
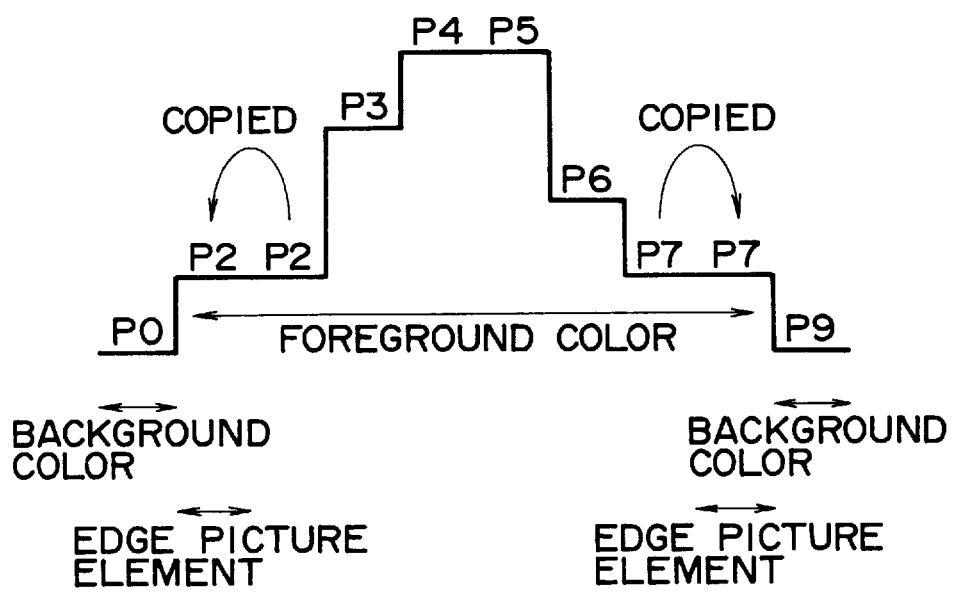

FIGS. 4A and 4B illustrate an operation example of an edge spread processing. FIG. 4A illustrates an input image signal, and FIG. 4B illustrates an image signal after the edge spread processing is applied.

The edge spread processing is a processing for solving the problem as follows. That is, when executing the anti-aliasing processing to the key signal, the key signal spreads from the foreground area into the background area, and the background area that should originally be made transparent can be observed during the image synthesization. Concretely, the key area spreading out into the background area can be detected in advance from the filter size for applying the anti-aliasing processing. Therefore, to a pixel corresponding to the foregoing area of the image signal, the edge spread processing executes a copy of the nearest border pixel (foreground pixel adjoining to the background area). As illustrated in FIG. 4B, P2 is copied onto P1, and P7 is copied onto P8; that is, two pixels of the foreground color are spread on both sides.

Figure 5A:
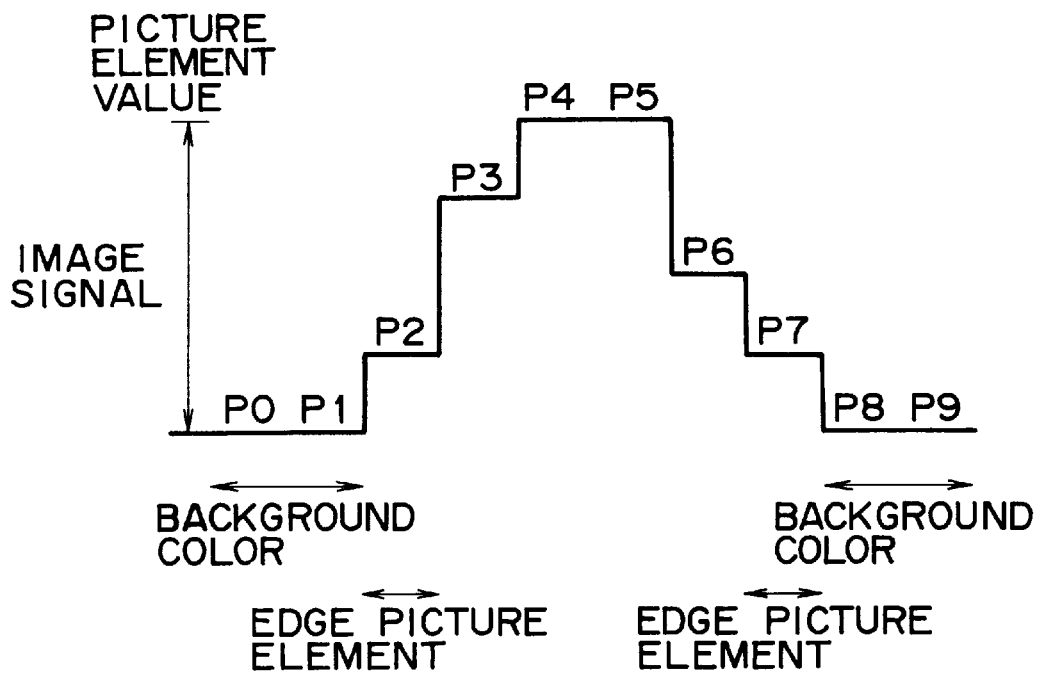
FIGS. 5A and 5B are charts to illustrate an operation example of an edge protection processing.
Figure 5B:
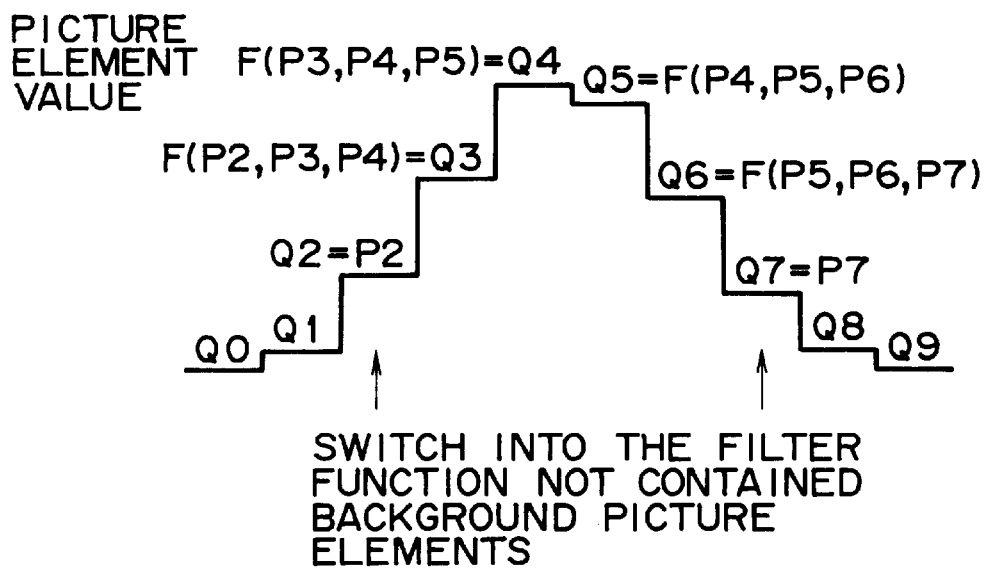

FIGS. 5A and 5B illustrate an operation example of an edge protection processing. FIG. 5A illustrates an input image signal Pi, and FIG. 5B illustrates an image signal Qi after the edge protection processing is applied.

The edge protection processing is to prevent the background color from mixing with the foreground color, when executing the anti-aliasing filter operation to the image signal. Concretely, the foreground pixel mixed with the background color, that is, the edge pixel can be detected in advance from the filter size for applying the anti-aliasing processing. Therefore, only the filter function corresponding to the foregoing edge pixel is switched into a filter function which does not contain the background pixel. As illustrated in FIG. 5B, as to the edge pixels (i=2, 7), Q2=P2, Q7=P7 are premised, and each of them is made to contain the background pixel P1, P8. As to the other pixels, the following filter operation is applied.

$$Qi = F(Pi-1, Pi, Pi+1)$$

$$= (Pi-1 + 2Pi + Pi+1)/4$$

Figure 6A:
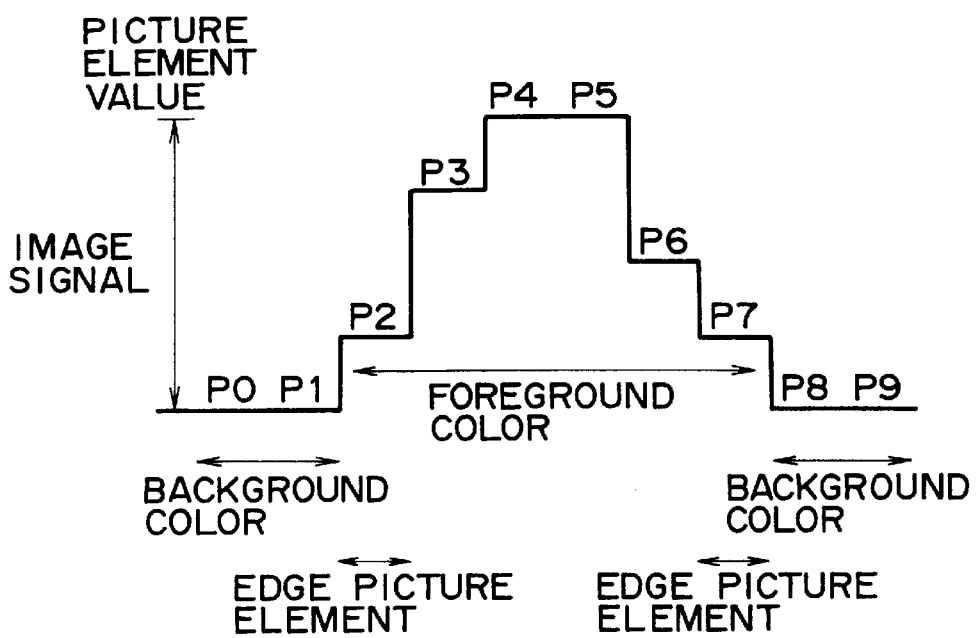
FIGS. 6A and 6B are charts to illustrate an operation example when the edge spread processing and the edge protection processing are combined.
Figure 6B:
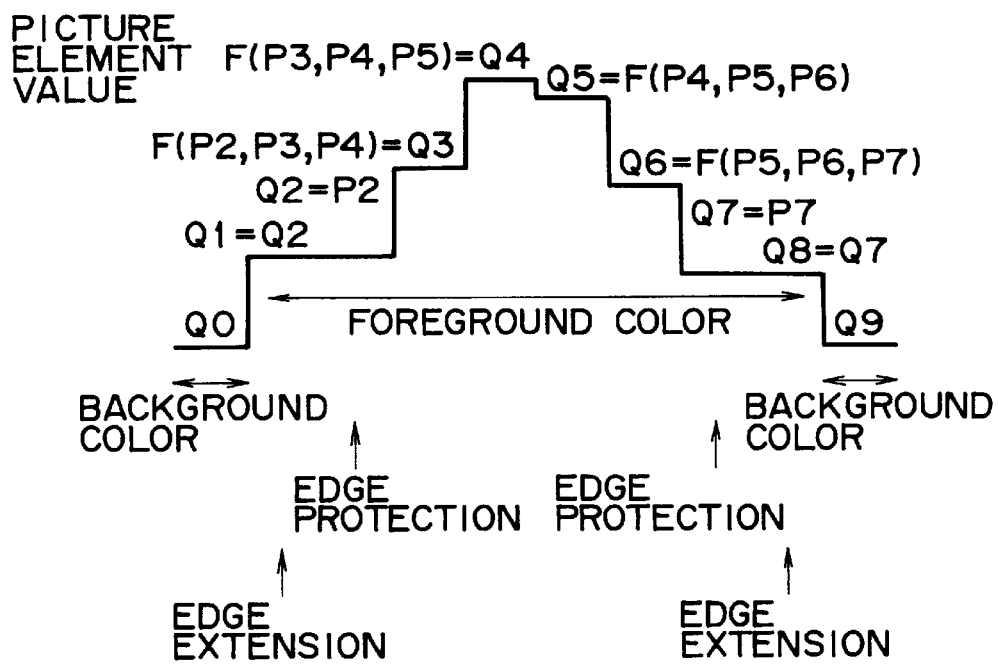

FIGS. 6A and 6B illustrate an operation example when the edge spread processing and the edge protection processing are combined. FIG. 6A illustrates an input image signal Pi, and FIG. 6B illustrates an image signal Qi after the edge spread processing and the edge protection processing are applied.

As shown in FIG. 6B, the combination of the edge spread processing and the edge protection processing will completely prevent the background color from mixing with the synthesized image, while the anti-aliasing filter processing is applied to the image signal and the key signal at the same time.

Figure 7:
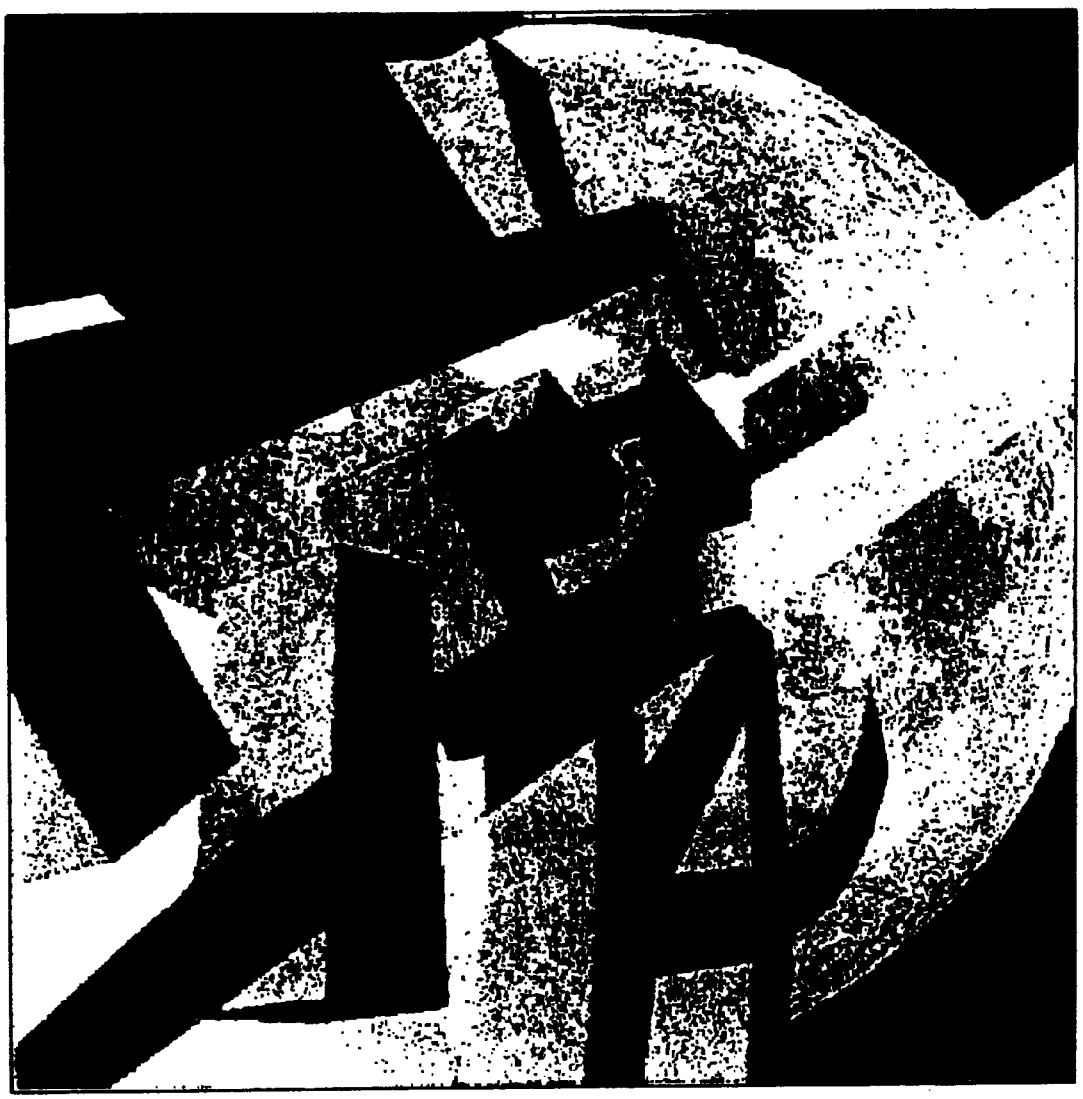
FIG. 7 is a chart to illustrate a synthesized image generated by the foregoing image processing unit.
Figure 8:
FIG. 8 is a chart to illustrate a synthesized image to which the anti-aliasing processing is not applied.

Accordingly, when the image signal processing unit 1 synthesizes a foreground image shown in FIG. 2 with a background image shown in FIG. 3, it is able to generate a synthesized image shown in FIG. 7, to which the anti-aliasing processing is applied. This synthesized image does not involve a deterioration of the picture quality such as the color mixture of the background color with the foreground image, as shown in FIG. 8.

Figure 9A:
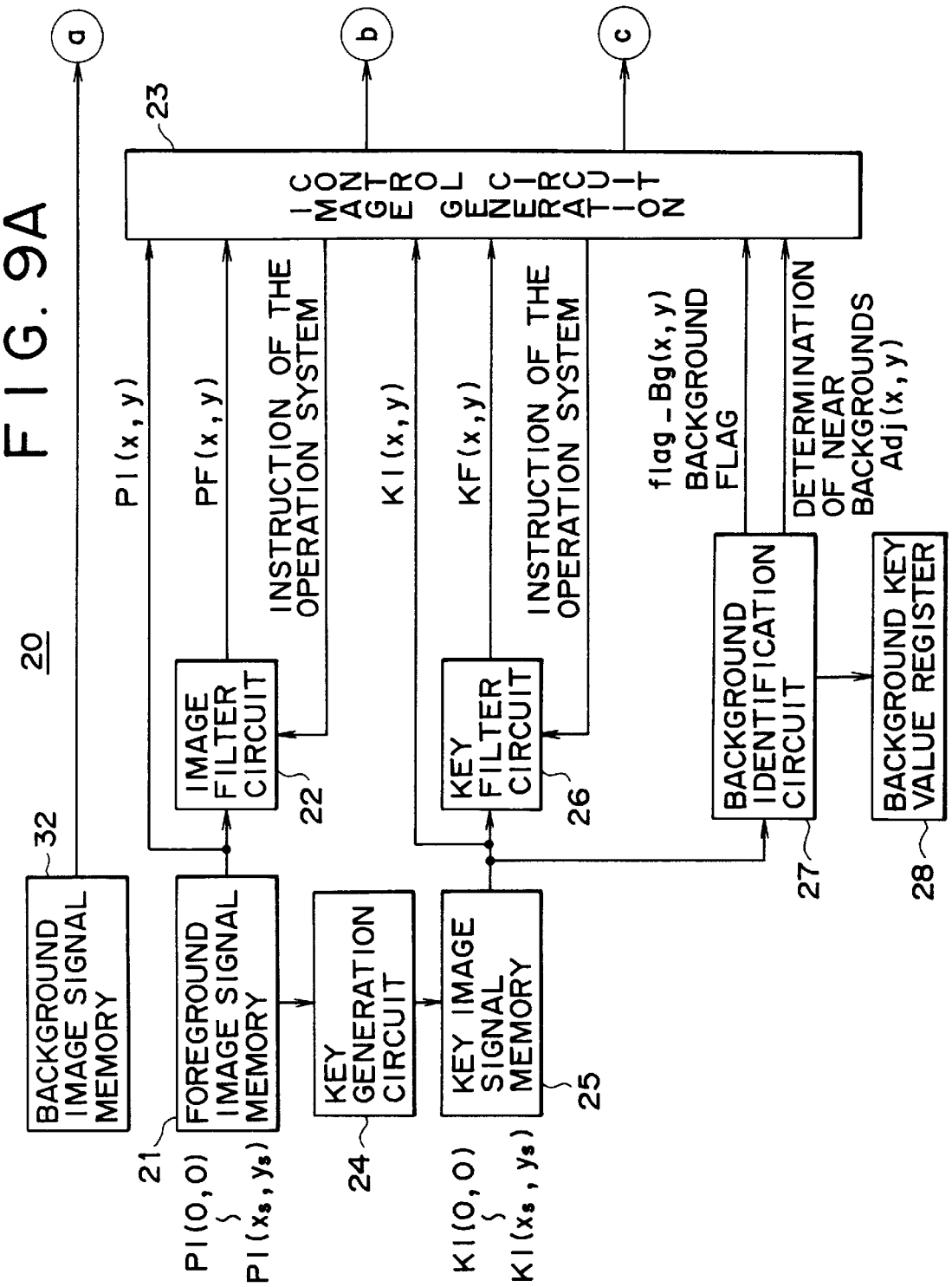

Next, another embodiment of the invention will be described. This embodiment is illustrated by an image processing unit 20 in FIGS. 9A and 9B. Basically, in the same manner as the foregoing image processing unit 1, the image processing unit 20 synthesizes a foreground image as a computer graphic image with a background image as a photograph, for example, by using a key signal.

In this image processing unit 20, input foreground images PI(0, 0)–PI(xs, ys) are stored in a memory 21 having the size for one image plane. And, key images KI(0, 0)–KI(xs, ys) are also stored in a memory 25 having the size for one image plane. And, the background images are also stored in a memory 32 having the size for one image plane.

The key images KI(0, 0)–KI(xs, ys) are generated by a key generation circuit 24; however, the key images may be input from outside into the memory 25 for the key image signal. That is, when the key image is supplied from outside, the supplied key image is employed as it is. When the key image is not supplied, the chromakey processing, for example, to extract a specific color gamut area from the input image can be performed to thereby produce the key image.

The image filter circuit 22 applies the anti-aliasing processing to the foreground image signal, in the same manner as the image filter circuit 3 as shown in FIG. 1.

The key filter circuit 26 applies the anti-aliasing processing to the key signal, in the same manner as the key filter circuit 5 as shown in FIG. 1.

The image filter circuit 22 applies the anti-aliasing processing to the foreground image signal, in the same manner as the image filter circuit 3 as shown in FIG. 1.

These filter operation circuits take on multi-stage pipeline configurations, and temporarily store all the pixels involved with the filter operations; and thereby, each of these circuits is able to execute the filter operation in correspondence with the pattern of the pixel instructed by the image generation control circuit 23 described later. Further, utilizing the information of near pixels stored, the filter operation circuit is able to output a copy of a near pixel value and an average of a plurality of the near pixel values.

The image generation control circuit 23 contains the function of the foregoing pixel detection circuit 6, detects the patterns of pixels, and instructs the operation systems that the image filter circuit 22 and the key filter circuit 26 execute.

The background identification circuit 27 possesses a register 28 (not only one value, but possibly a range of values) to store a key value treated as the background, compares the key value stored in the register 28 with the key value input, and outputs a background color flag, flag_Bg(x, y), to indicate whether the input key signal is a background pixel or not. Further, the background identification circuit 27 outputs a near background judgment flag Adj(x, y) to indicate whether the near pixel is a background or not.

A filter output PF(x, y) of a foreground image from the image filter circuit 22 is stored in an output image memory 29 as output images PO(0, 0)–PO(xs, ys) through the image generation control circuit 23.

A filter output KF(x, y) of a key image from the key filter circuit 26 is stored in a key output memory 30 as key signal outputs KO(0, 0)–KO(xs, ys) through the image generation control circuit 23.

The key signal output from the key output memory 30 is supplied to a multiplier 31, where the key signal output is multiplied by an output image from the output image memory 29. The value of a remainder computed by subtracting the key signal output from 1 is supplied to a multiplier 33, where the foregoing remainder value is multiplied by a background image signal read out from a background image signal memory 32.

The outputs from the multiplier 31 and the multiplier 33 are added by an adder 34 to output a synthesized image from an output terminal 35.

Figure 10:
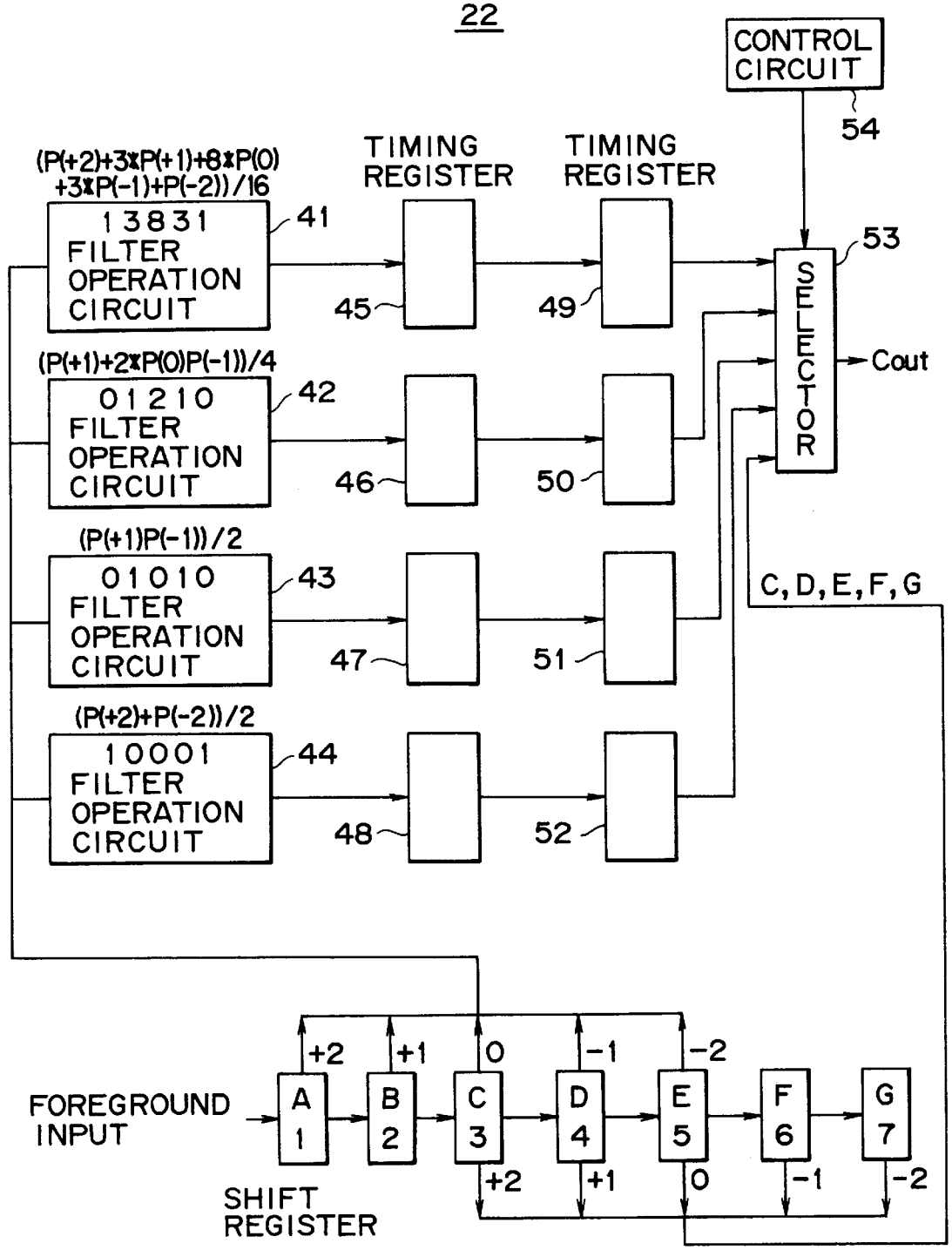
FIG. 10 is a block diagram to illustrate a concrete detailed example of an image filter circuit contained in the image processing unit shown in FIG. 9.

As the image filter circuit 22, a five-tap filter circuit as shown in FIG. 10 can be employed. The image filter circuit 22 contains seven shift registers A, B, C, D, E, F, and G to which the foregoing foreground image PI( ) is input, filter operation circuits 41, 42, 43, and 44 that operate the foreground image PI( ) multiplied by +2, +1, 0, −1, −2 by the shift registers A, B, C, D, E with intrinsic weighting factors, timing registers 45, 46, 47, and 48 that regulate the filter outputs from the filter operation circuits 41, 42, 43, and 44 on the time base, timing registers 49, 50, 51, and 52 that regulate the outputs from the foregoing timing registers on the time base, and a selector 53 to switch and select a foreground image PI( ) multiplied by +2, +1, 0, −1, and −2 by the shift registers C, D, E, F, G of the seven shift registers A, B, C, D, E, F, and G, or filter outputs through the timing registers 49, 50, 51, and 52 on the basis of the control of a control circuit 54. Here, each of the operation filters 41, 42, 43, and 44 completes the operation within one clock.

Figure 11:
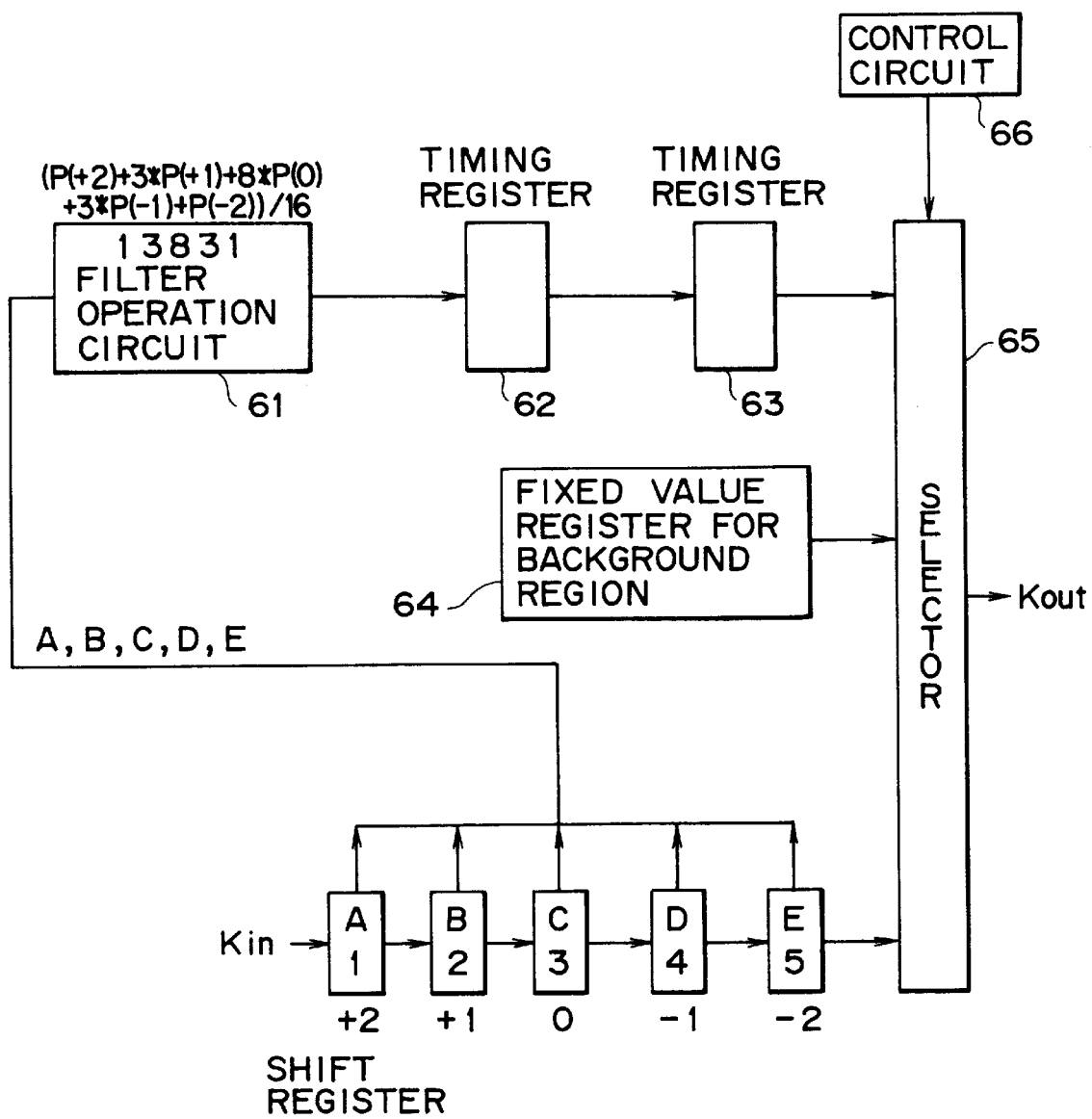
FIG. 11 is a block diagram to illustrate a concrete detailed example of a key filter circuit contained in the image processing unit shown in FIG. 9.

As the key filter circuit 26, the five-tap filter circuit as shown in FIG. 11 can be employed.

The key filter circuit 26 contains five shift registers A, B, C, D, and E to which the foregoing key image KI( ) is input, a filter operation circuit 61 that operates the key image KI( ) multiplied by +2, +1, 0, −1, −2 by the shift registers A, B, C, D, E with an intrinsic weighting factor, a timing register 62 that regulates the filter output from the filter operation circuit 61 on the time base, a timing register 63 that regulates the output from the foregoing timing register on the time base, a fixed value register 64 for a background area that stores a key value of an area to be made transparent as the background area in the foreground image, and a selector 65 to switch and select a filter output of the filter operation circuit 61 through the timing register 63, a fixed value from the fixed value register 64 for a background area, or a register output from the shift registers A, B, C, D, and E, on the basis of the control of a control circuit 66.

The fixed value register 64 for a background area is required to treat key values within some range as the background, in such a case that a key image is replaced by a blueback. However, it is useless to carry out the filter operation to the background area to be made transparent. Therefore, the fixed value register 64 is designed to be able to replace the pixel values in an area to be made transparent with a certain fixed value.

Figure 12A:
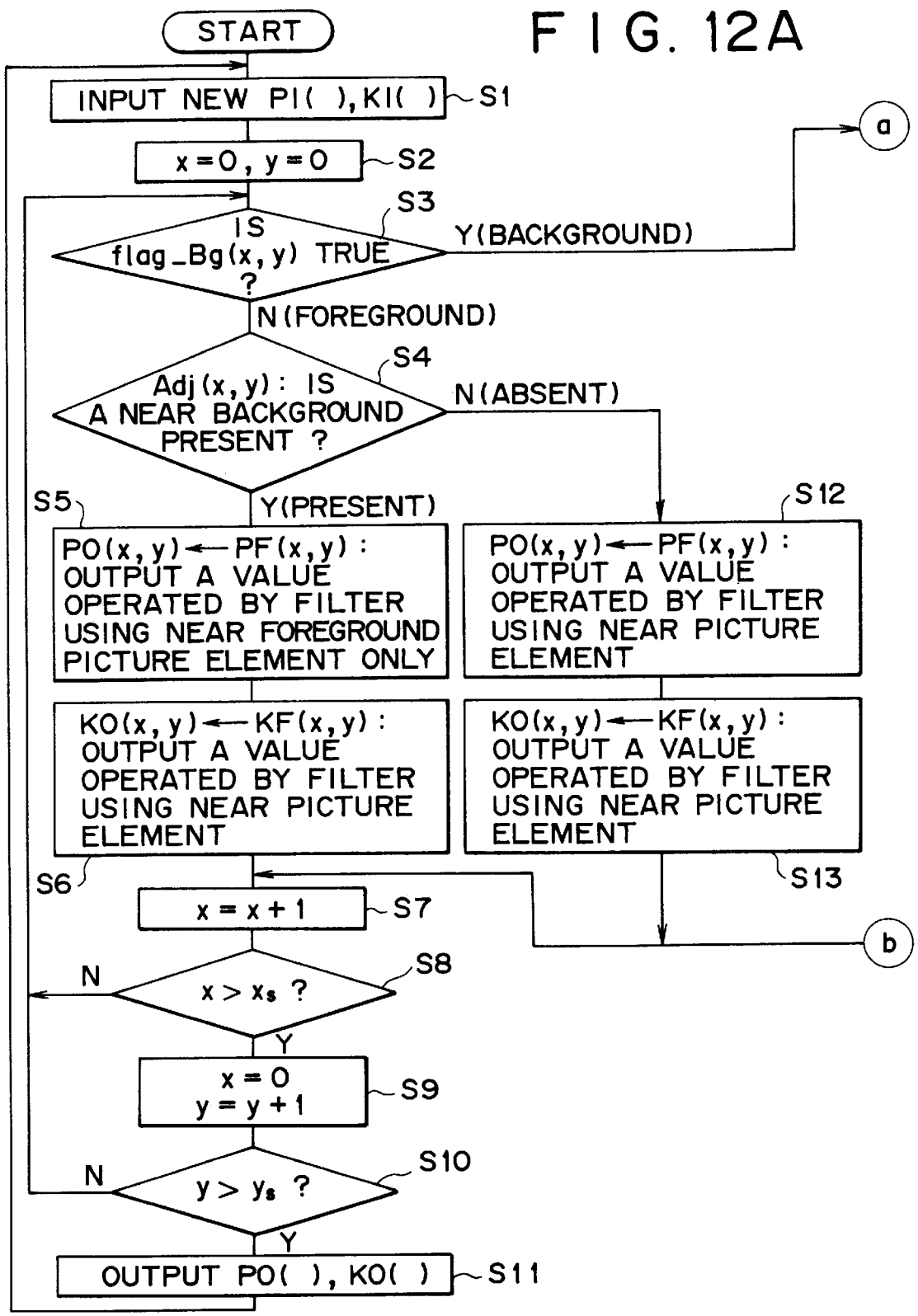
FIGS. 12, 12A and 12B are flow charts to explain the operation of the image processing unit shown in FIG. 9.
Figure 12B:
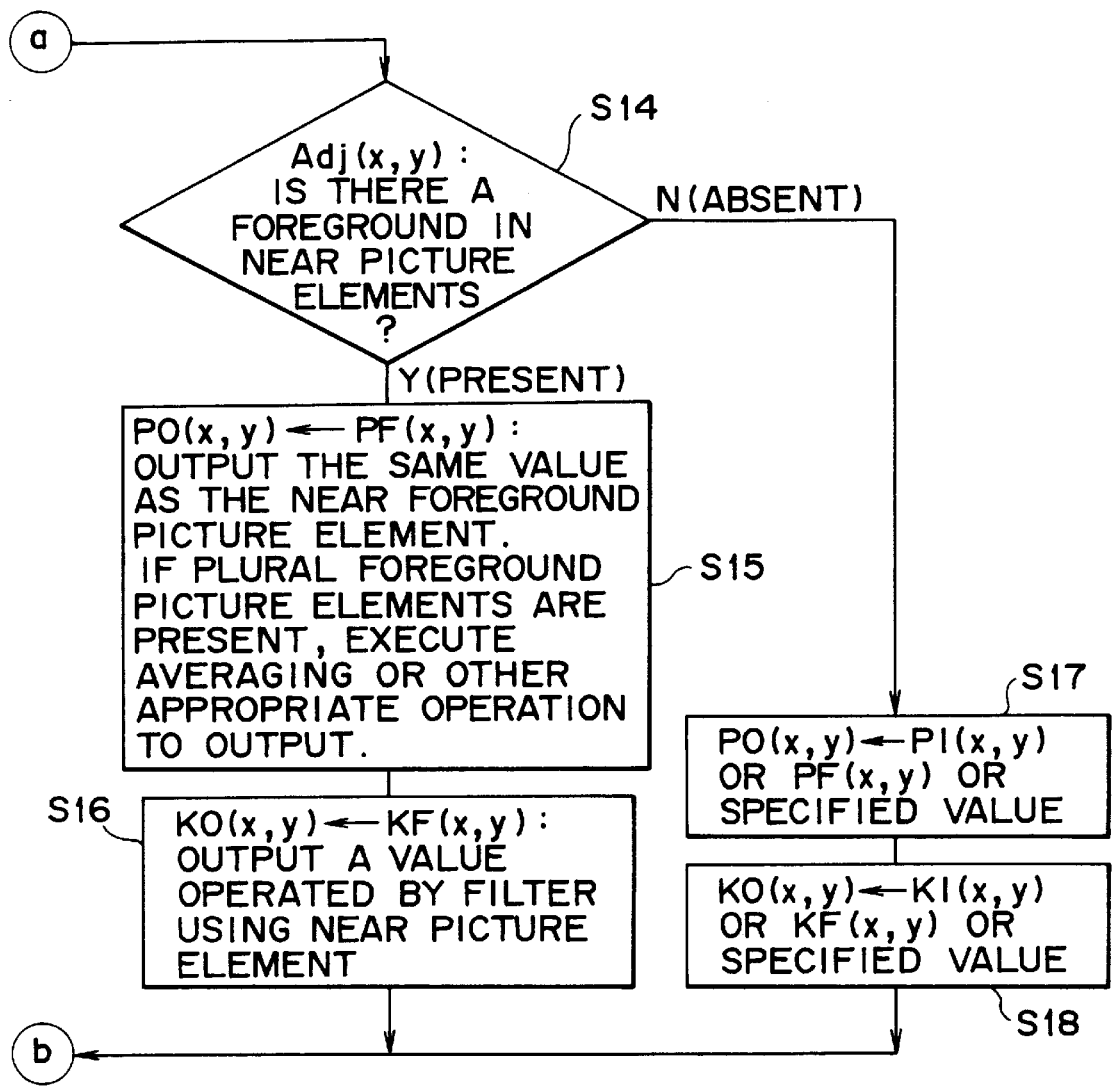
Figure 12:
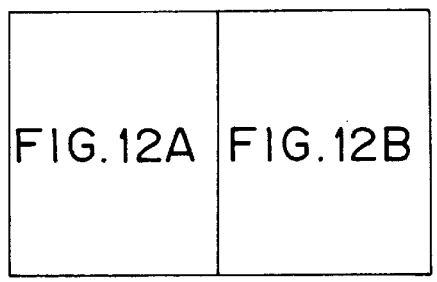
Figure 13A:
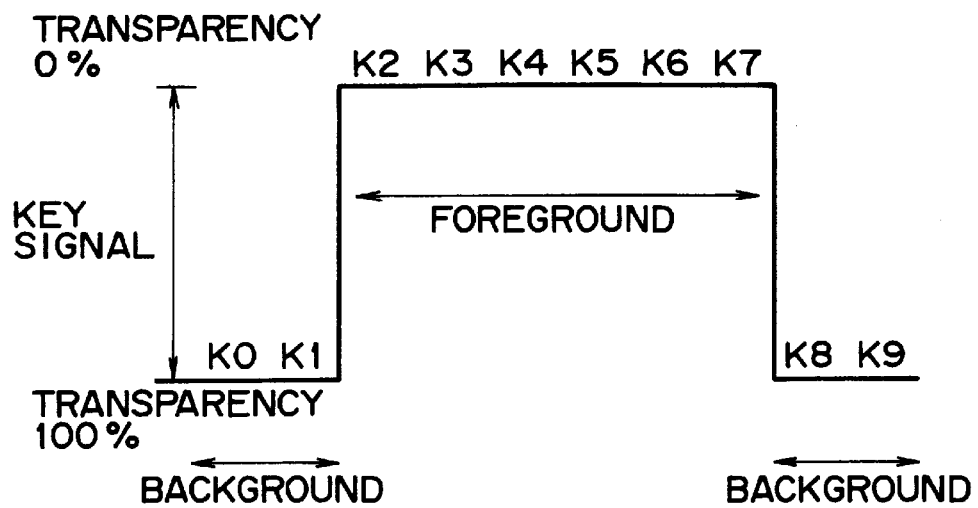
FIGS. 13A and 13B are charts to illustrate a problem when a simple anti-aliasing filter operation is applied to an image signal.
Figure 13B:
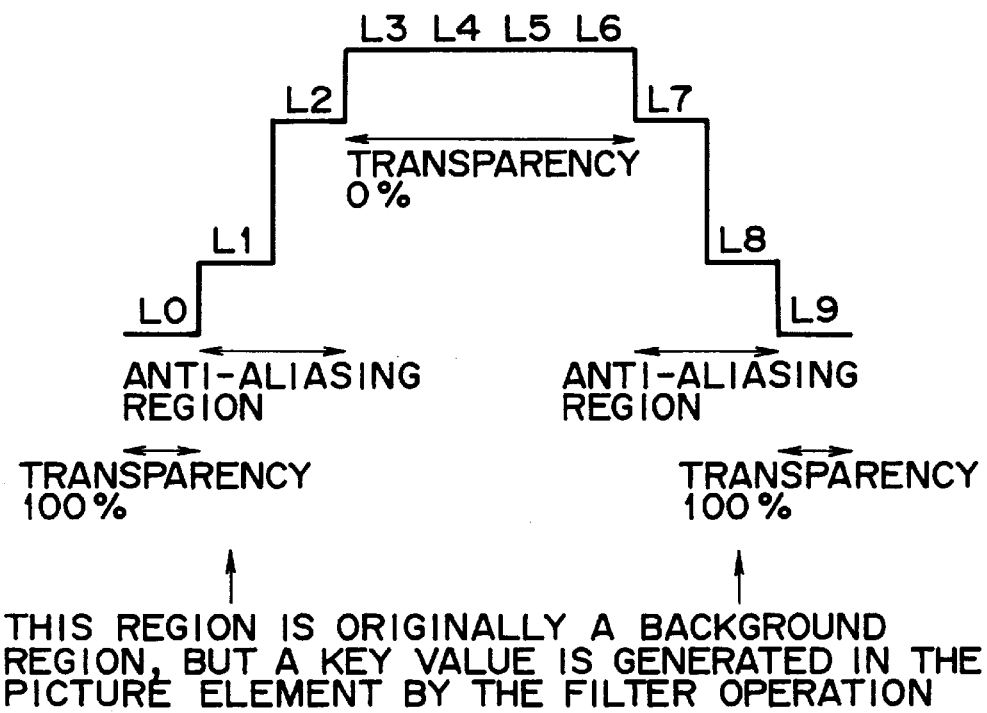
Figure 14A:
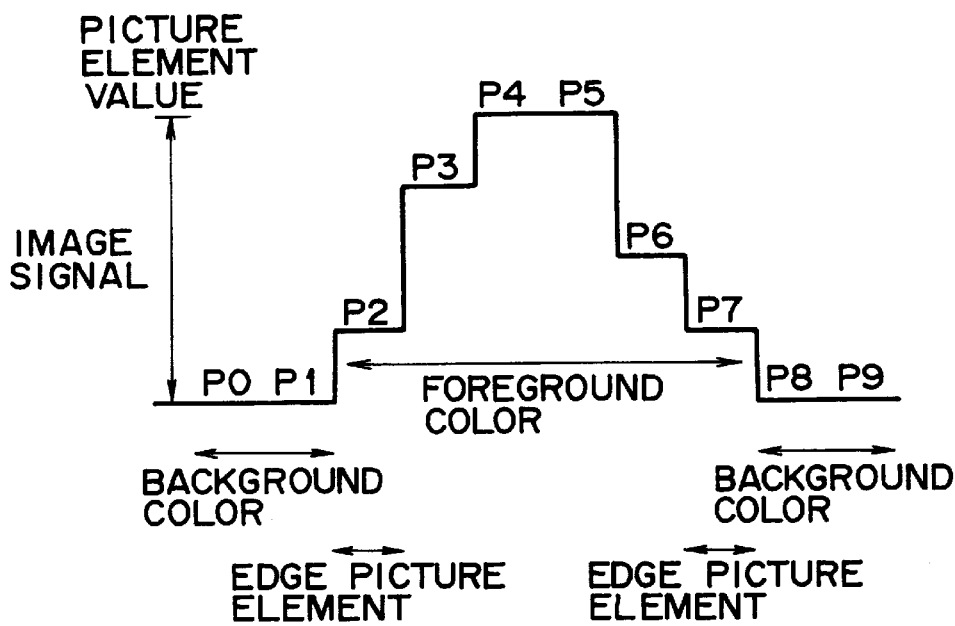
FIGS. 14A and 14B are charts to illustrate a problem when a simple anti-aliasing filter operation is applied to a key signal.
Figure 14B:
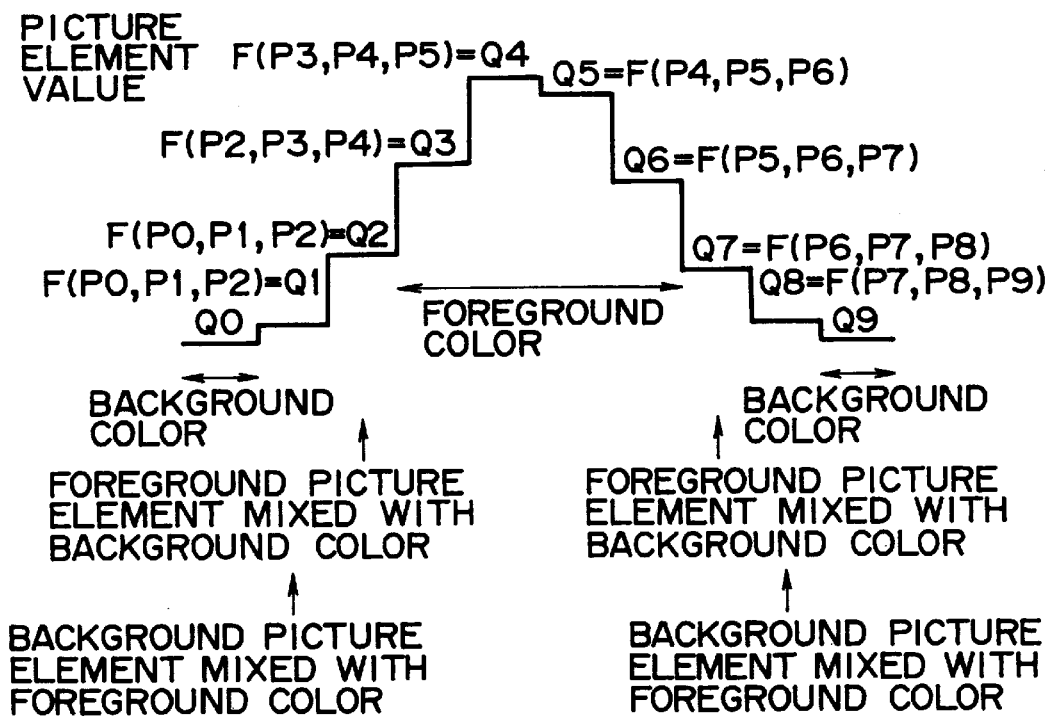

The operation of the image processing unit 20 provided with the image filter circuit 22 and the key filter circuit 26 as shown in FIG. 10 and FIG. 11 will be described with reference to a flow chart in FIGS. 12, 12A and 12B. Here, a near pixel denotes all the pixels involved with the filter operation of the object pixel (x, y).

First, the step S1 inputs the foreground image signal PI( ) to the foregoing image filter circuit 22, and inputs the key image signal KI( ) to the foregoing key filter circuit 26. The step S2 initializes the data: x=0, y=0.

Next, the background color identification circuit 27 determines whether the key signal KI( ) input to the register C of the image filter circuit 22 is a background or not, and supplies a background color flag flag__Bg(x, y) to the image generation control circuit 23. At the step S3, the image generation control circuit 23 determines whether the background color flag flag__Bg(x, y) is true or not. Here, if the background color flag flag__Bg(x, y) is not true, and is a foreground, the process advances to the step S4; and if the background color flag flag__Bg(x, y) is true, and is a foreground, the process advances to the step S14.

The step S4 determines whether or not a near background is present on the basis of a flag Ajd(x, y) from the background color identification circuit 27, indicating whether a near pixel is a background. Here, if a near background is present, the process advances to the step S5. If a near background is not present, the process advances to the step S12.

The step S5 renders the selector 53 to output a value PF(x, y) obtained by the filter operation with a near foreground pixel only, as an output PO(x, y).

The step S6 renders the selector 53 to output a value KF(x, y) obtained by the filter operation with a near pixel, as a key signal output KI(x, y).

The step S7 applies an increment to the value of x. Until the step S8 determines that x is larger than xs, the processes from the step 3 through the step 7 are repeated. If the step S8 determines that x is larger than xs, the process advances to the step S9. The step S9 substitutes x by 0 (x=0), and applies increment to y; and until the step S10 determines that y is larger than ys, the processes from the step 3 through the step 9 are repeated.

If the step S10 determines that y is larger than ys, the process advances to the step S11 to output PO( ), KO( ).

When the step S4 determines that a near background is not present from the flag Ajd(x, y), the step S12 renders the selector 53 to select and output the value PF(x, y) obtained by the filter operation with a near pixel, as the output PO(x, y).

The step S13 renders the selector 53 to output the value KF(x, y) obtained by the filter operation with a near pixel, as the key signal output KI(x, y). Thereafter, the process moves to the steps after the step S7.

When the step S3 determines that the background color flag (flag__Bg(x, y)) is true, and is a foreground, the step S14 determines whether a near foreground is present on the basis of the flag Ajd(x, y). If there is a near foreground, the process advances to the step S15. If not, the process moves to the step S17.

The step S15 renders the selector 53 to output the operation output PF(x, y) having the same value as the near foreground pixel as the output PO(x, y), that is, copies the near foreground pixel. If there are a plurality of near foreground pixels, the step S15 averages their values or executes another appropriate operation to make the operation output.

The step S16 renders the selector 53 to output the value KF(x, y) obtained by the filter operation with a near pixel, as the key signal output KI(x, y). Thereafter, the process moves to the steps after the step S7.

When the step S14 determines that there is not a foreground in the near pixels from the flag Ajd(x, y), the step S17 renders the selector 53 to output the PI(x, y), PF(x, y), or a specified value as the output PO(x, y).

The step S18 renders the selector 53 to output an input key signal image KI(x, y), the value KF(x, y) obtained by the filter operation with a near pixel, or a specified value as the key signal output KO(x, y). Thereafter, the process moves to the steps after the step S7.

Next, the operation of the image processing unit 20 will be described in detail with respect to a variety of foreground/background discriminations by background identification circuit 27.

In the following discussion, an x within the curly brackets denotes that the discrimination of the foreground/background by the background identification circuit 27 is a background pixel. A 0 within the curly brackets denotes that background identification circuit 27 has discriminated a foreground pixel.

Receiving the discrimination results of the foreground/background, the image generation control circuit 23 instructs the operation system for the filter output PF(x, y) to the image filter circuit 22, and on the other hand, renders the output image memory 29 to store the foreground image signal PI(x, y) as the output image PO(x, y). Hereafter, the operation system in the image filter circuit 22 will be described mainly, and the control of the key filter circuit 26 for the filter output KF(x, y) will be omitted. It is assumed in the following description that the center of the filter range corresponds to the pixel on the very point of being outputted.

When the five pixels input in the shift registers A, B, C, D, and E are all backgrounds, indicated by {xxxxx}, the operation is as follows.

First, when the step S3 determines that the center of the filter range, namely, the pixel that the shift register C is about to output, is a background from the background flag flag__Bg(x, y), the process advances to the step S14, which determines on the basis of the flag Adj(x, y) whether there is a near foreground or not. Since there is not a foreground, the process advances to the step S17. The step S17 selects the input foreground image signal PI(0) from the shift register E, and renders the selector 53 to select the image signal PI(0) as the output PO(0) and the output image memory 29 to store the output PO(0).

Next, when the five pixels are shown by {xxxx0}, the step S14 determines that there is a foreground in the near pixel, and advances to the step S15. The step S15 renders the selector 53 to select the same value as the near foreground pixel from the shift register G as PI(−2). Similarly, when the five pixels are shown by {xxx0x}, the step S14 determines that there is a foreground in the near pixel, and advances to the step S15. The step S15 renders the selector 53 to select PI(−1) from the shift register F.

When the five pixels are shown by {xx0xx}, since the center of the filter corresponds to a foreground, the process moves to the step S4 from the step S3. Since the step S4 determines that there is a near background, the process advances to the step S5. The step S5 selects a value obtained by the filter operation using the near foreground pixels only. However, since the near foreground pixel is the foreground pixel PI(0) in the center, the step S5 renders the selector 53 to select this PI(0) from the shift register E.

When the five pixels are shown by {x0x0x}, since the center of the filter is a background, the process advances to the step S14. Since the step S14 determines that there is a foreground in the near pixels, the process advances to the step S15. Since there is a plurality of near foreground pixels at the step S15, the filter operation circuit 43 executes a filter operation (P(+1)+P(−1))/2 using a weighting factor "01010". Passing the filter operation output through the timing registers 47 and 51, the step S15 renders the selector 53 to select the operation output.

When the five pixels are shown by {x000x}, since the center of the filter corresponds to a foreground, the process moves to the step S4. Since the step S4 determines that there is a background in the near pixels, the process advances to the step S5. At the step S5, the filter operation circuit 42 executes a filter operation (P(+1)+2*P(0)+P(−1))/4 using a weighting factor "01210". Passing the filter operation output through the timing registers 46 and 50, the step S5 renders the selector 53 to select the operation output.

When the five pixels are shown by {0xxx0}, since the center of filter is a background, the process advances to the step S14. Since the step S14 determines that there is a foreground in the near pixels, the process advances to the step S15. Since there is a plurality of near foreground pixels, at the step S15, the filter operation circuit 44 executes a filter operation (P(+2)+P(−2))/2 using a weighting factor "10001". Passing the filter operation output through the timing registers 48 and 52, the step S15 renders the selector 53 to select the operation output.

When the five pixels are shown by {00000}, since the center of the filter corresponds to a foreground, the process moves to the step S4. Since the step S4 determines that there is not a background in the near pixels, the process advances to the step S12. At the step S12, the filter operation circuit 42 executes a filter operation (P(+2)+3*P(+1)+8*P(0)++3*P(−1)+P(−2))/16 using a weighting factor "13831". Passing the filter operation output through the timing registers 45 and 49, the step S12 renders the selector 53 to select the operation output.

Thus, when detecting a pixel having a possibility to generate the color mixture by the operation of the image filter circuit 22, the image processing unit 20 renders the selector 53 inside the image filter circuit 22 to select the output obtained by the anti-aliasing processing using only the pixel that constitutes the foreground image and does not contain the background color. Further, the image processing unit 20 detects an area where the foregoing key signal spreads to a background color of the foreground image, and as to the area, renders the selector 53 to select the output obtained by the anti-aliasing processing that copies the foreground image onto the background color.

Further, in the foregoing image processing unit 20 as shown in FIG. 9, the input image PI( ) and key image KI( ) are premised to be stored in a memory having the size for one image plane. However, each of the circuits may contain a memory size that can store all the near pixels required for the filter operation. With this arrangement, it is possible to process real time video signals without a large-capacity frame buffer.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing unit to synthesize a foreground image and a background image using a key signal, the image processing unit comprising:

an image filter circuit that applies to said foreground image at least an anti-aliasing processing to make obscure aliasing noises appearing on a border of a graphic image;

a key filter circuit that applies said anti-aliasing processing to said key signal; and a pixel detection circuit that detects a pixel having a possibility to generate a color mixture by an operation of said image filter circuit from said key signal and a size of said image filter circuit, wherein said image filter circuit applies an anti-aliasing processing using only the pixel that constitutes said foreground image and does not contain a background color to the pixel having a possibility to generate the color mixture that said pixel detection circuit detects.

2. An image processing unit as claimed in claim 1, wherein the pixel detection circuit detects a border part between a foreground color and a background color of the foreground image from the key signal.

3. An image processing unit as claimed in claim 2, wherein, as to the border part that the pixel detection circuit detects, the image filter circuit copies the foreground color of the foreground image onto a background color part.

4. An image processing unit as claimed in claim 1, wherein the image filter circuit applies an anti-aliasing processing of odd taps to the foreground image.

5. An image processing unit as claimed in claim 4, wherein the image filter circuit applies the anti-aliasing processing of three or five taps to the foreground image.

6. An image processing unit to synthesize a foreground image and a background image using a key signal, the image processing unit comprising:

an image filter circuit that applies to said foreground image at least an anti-aliasing processing to make obscure aliasing noises appearing on a border of a graphic image;

a key filter circuit that applies said anti-aliasing processing to said key signal; and a pixel detection circuit that detects a pixel having a possibility to generate a color mixture by an operation of said image filter circuit from said key signal and a size of said image filter circuit, wherein said image filter circuit applies an anti-aliasing processing using only the pixel that constitutes said foreground image and does not contain a background color to the pixel having a possibility to generate the color mixture that said pixel detection circuit detects; and wherein the pixel detection circuit comprises:

a circuit for detecting an area where the key signal spreads to the background color of the foreground image based on the size of the key filter circuit and a circuit for copying a border pixel of a nearest foreground onto the area.

7. An image processing method for synthesizing a foreground image and a background image using a key signal, when applying at least an anti-aliasing processing to obscure aliasing noise appearing on a border of a graphic image to both an image signal and the key signal, the image processing method comprising the steps of:

detecting a pixel having a possibility to generate a color mixture by an operation of an image filter from a size of the image filter that applies the anti-aliasing processing to said foreground image; and applying to the pixel the anti-aliasing processing by said image filter, which uses only the pixel not containing a background color.

8. An image processing method as claimed in claim 7, wherein a border part between a foreground color and a background color of the foreground image is detected from the key signal, and as to the border part, the foreground color of the foreground image is copied onto a background color part.

9. An image processing method as claimed in claim 7, wherein an area in which the key signal spreads to the background color of the foreground image is detected from the size of a key filter circuit that applies the anti-aliasing processing to the key signal, and an anti-aliasing processing that copies a border pixel of a nearest foreground is applied to the area.

10. An image processing method as claimed in claim 7, wherein the image filter applies the anti-aliasing processing of odd taps to the foreground image.

11. An image processing method as claimed in claim 10, wherein the image filter applies the anti-aliasing processing of three or five taps to the foreground image.

12. An image processing unit to synthesize a foreground image and a background image using a key signal, the image processing unit comprising:

an image filter circuit that applies to said foreground image an anti-aliasing processing to make obscure an aliasing that displays a slant graphic border in a stepped indentation due to an insufficiency of the number of pixels;

a control circuit that, on the basis of an identification result of a foreground color/background color of pixels input to said image filter circuit, instructs an operation system of the image filter circuit, or controls to select a copy of the input pixels; and a key filter circuit that applies said anti-aliasing processing to said key signal, wherein, when said control circuit detects a pixel having a possibility to generate a color mixture from the identification result of the foreground color/background color, said image filter circuit applies an anti-aliasing processing using only the pixel that constitutes said foreground image and does not contain a background color.

13. An image processing unit as claimed in claim 12, wherein, when said control circuit detects a border part between the foreground color and the background color of the foreground image from the identification result of the foreground color/background color, as to the border part, said control circuit copies the foreground color of the foreground image onto a background color part.

14. An image processing unit as claimed in claim 12, wherein the control circuit renders the image filter circuit to apply an anti-aliasing processing of odd taps to the foreground image.

15. An image processing unit as claimed in claim 14, wherein the control circuit renders the image filter circuit to execute the anti-aliasing processing of three or five taps.

16. An image processing unit to synthesize a foreground image and a background image using a key signal, the image processing unit comprising:

an image filter circuit that applies to said foreground image an anti-aliasing processing to make obscure an aliasing that displays a slant graphic border in a stepped indentation due to an insufficiency of the number of pixels;

a control circuit that, on the basis of an identification result of a foreground color/background color of pixels input to said image filter circuit, instructs an operation system of the image filter circuit, or controls to select a copy of the input pixels; and a key filter circuit that applies said anti-aliasing processing to said key signal, wherein, when said control circuit detects a pixel having a possibility to generate a color mixture from the identification result of the foreground color/background color, said image filter circuit applies an anti-aliasing processing using only the pixel that constitutes said foreground image and does not contain a background color;

and wherein, when detecting an area where the key signal spreads to the background color of the foreground image from the size of the key filter circuit, said control circuit copies a border pixel of a nearest foreground onto the area.

17. An image processing method for synthesizing a foreground image and a background image using a key signal, comprising the steps of:

inputting a foreground image signal, a background image signal and the key signal;

identifying foreground color pixels and background color pixels from the foreground image signal and the background image signal; and determining whether to copy or apply an anti-aliasing filter to at least one of the foreground color pixels and the background color pixels, depending on the results of the identifying step.

18. An image processing method as claimed in claim 17, wherein, when a pixel having a possibility to generate a color mixture is identified in the identifying step, the anti-aliasing filter is applied only to the pixel that constitutes the foreground image and does not contain a background color.

19. An image processing method as claimed in claim 17, wherein, when a border part between a foreground color and a background color of the foreground image is identified in the identifying step, the foreground color of the foreground image is copied onto a background color part as to the border part.

20. An image processing method as claimed in claim 17, wherein, when an area in which the key signal spreads to a background color of the foreground image is detected from a size of a key filter unit that applies an anti-aliasing processing to the key signal, a border pixel of a nearest foreground is copied onto the area.

21. An image processing method as claimed in claim 17, wherein an anti-aliasing filter of odd taps is applied to the foreground image.

22. An image processing method as claimed in claim 21, wherein an anti-aliasing filter of three or five taps is applied to the foreground image.

* * * * *